US008316836B2

(12) United States Patent
Grasso et al.

(10) Patent No.: US 8,316,836 B2
(45) Date of Patent: Nov. 27, 2012

(54) GRILL HANDLE WITH HEAT SHIELD

(75) Inventors: James Grasso, Arlington Heights, IL (US); Ewald Sieg, Palatine, IL (US); Charles Choi, Chicago, IL (US); Anthony A. Bruno, Rolling Meadows, IL (US)

(73) Assignee: Weber-Stephen Products Co., Inc., Palatine, IL (US)

( * ) Notice: Subject to any disclaimer, the term of this patent is extended or adjusted under 35 U.S.C. 154(b) by 0 days.

(21) Appl. No.: 12/575,918

(22) Filed: Oct. 8, 2009

(65) Prior Publication Data

US 2011/0083659 A1    Apr. 14, 2011

(51) Int. Cl.
*A47J 37/07*    (2006.01)
(52) U.S. Cl. .................................. 126/25 R; 126/220
(58) Field of Classification Search ............... 126/25 R, 126/220, 211; 16/110.1
See application file for complete search history.

(56) References Cited

U.S. PATENT DOCUMENTS

| | | | |
|---|---|---|---|
| 4,130,103 A | 12/1978 | Zimmerman | |
| 4,165,683 A * | 8/1979 | Van Gilst | 99/393 |
| 4,227,510 A | 10/1980 | Frazier et al. | |
| 4,417,565 A | 11/1983 | Karpinia | |
| 4,498,452 A | 2/1985 | Schlosser et al. | |
| 4,677,964 A * | 7/1987 | Lohmeyer et al. | 126/41 R |
| 4,836,179 A | 6/1989 | Schlosser et al. | |
| 5,076,272 A | 12/1991 | Ferek-Petric | |
| 5,111,802 A | 5/1992 | Lin | |
| 5,299,553 A * | 4/1994 | Giebel et al. | 126/25 R |
| 5,469,835 A | 11/1995 | Stephen et al. | |
| D379,581 S | 6/1997 | Sieg et al. | |
| 5,638,807 A | 6/1997 | Flamenbaum | |
| 5,771,536 A | 6/1998 | Sieg et al. | |
| 5,787,873 A | 8/1998 | Whitehouse | |
| 5,850,828 A | 12/1998 | Valentino | |
| D415,653 S | 10/1999 | Schlosser et al. | |
| 6,155,248 A | 12/2000 | Schlosser et al. | |
| D435,761 S | 1/2001 | Johnson | |
| 2005/0051157 A1 | 3/2005 | Cuomo | |

FOREIGN PATENT DOCUMENTS

| | | |
|---|---|---|
| AU | 2007202420 B2 | 6/2007 |
| CH | 280129 | 4/1952 |
| JP | 1148208 | 6/1989 |
| RU | 2199933 C2 | 3/2003 |
| WO | 03034881 A1 | 5/2003 |
| WO | 2004054416 A1 | 7/2004 |

OTHER PUBLICATIONS

The British Standard—BS EN 1860-1:2003 entitled "Appliances, Solid Fuels and Firelighters for Barbecueing; Part 1: Barbecues burning solid fuels, Requirements and Test Methods".

* cited by examiner

*Primary Examiner* — Alfred Basichas
(74) *Attorney, Agent, or Firm* — Baker & McKenzie LLP

(57) ABSTRACT

Two main embodiments of a heat shield for a barbecue grill are disclosed herein. Both are designed to reduce the transfer of heat from the heated volume of the cooking chamber to the handle of the barbecue grill. The first embodiment mounts to the exterior of the cooking chamber and is disposed between the cooking chamber and the handle. The first embodiment is contoured to interrupt the convective flow of heated air away from the handle. The second embodiment mounts to the interior of the cooking chamber opposite the handle. The second embodiment rests adjacent the inside surface of the cooking chamber to form a partially or substantially closed volume that serves as an insulating barrier for the handle.

2 Claims, 5 Drawing Sheets

GRILL HANDLE WITH HEAT SHIELD

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Technical Field

The embodiments described and claimed herein relate generally to barbecue grill handles. More specifically, some of the embodiments relate to heat barrier structures which reduce the temperature of, and in the region of, barbecue grill handles.

2. Background Art

Barbecue grills are well known in the art. Typically, these barbecue grills include a cooking chamber and a support structure. The cooking chamber can simply comprise an open top firebox, or a combination of a firebox and a lid. In either case, it is typical for barbecue grills to be provided with one or more handles on the cooking chamber, either for moving the barbecue grill from location to another, or for opening and closing the lid.

Over the years, as barbecue grills have grown in popularity, various standards and regulations have been enacted which specify strict safety parameters for barbecue grills. One such standard, EN 1860-1:2003, section 4.2.6, precludes the surface temperature of the handle from exceeding certain values when tested under certain conditions. In their attempts to meet this standard, barbecue grill manufacturers have accepted and implemented two alternative solutions. The first is to increase the distance between the gripping portion of the handle and the cooking chamber. It is no surprise that grill manufacturers have adopted this obvious solution. Indeed, it is well known that the magnitude of radiation heat transfer between two objects is inversely proportional to the distance between the two objects; i.e., the farther the objects are away from each other, the lower the magnitude of radiation heat transfer. The same generally applies for conductive and convective heat transfer between two objects. The second solution is to use a material specified in the standard which has a high temperature criteria, e.g. wood. This is likewise an obvious solution.

Although the two solutions identified above are sufficient to meet the EN 1860-1:2003 standard, they both have their drawbacks. For example, both solutions result in an appearance which is less aesthetically pleasing and possibly less functional and wear-resistant. Increasing the distance between the handle and the grill can give a barbecue grill a less proportional appearance, and may cause difficulties with packaging the grill for retail sale in a compact manner. The extended handle can also impinge upon space constraints of the end user. Using wood as an alternative material is not preferable because many wood finishes quickly degrade when exposed to heat and sun, two conditions which are almost always present for barbecue grills.

BRIEF SUMMARY OF THE INVENTION

Several embodiments of barbecue grill with a heat barrier or shield for a barbecue grill handle are described and claimed herein. These embodiments employ various solutions for reducing the temperature of, and in the region of, a barbecue grill handle that run contrary to the accepted solutions of other individuals possessing skill in the pertinent art. The solutions disclosed herein negate the need to extend the distance between the handle and the cooking chamber of a grill, and the need to use materials with a high temperature threshold, such as wood. These solutions therefore provide the grill designer with flexibility in designing and selecting materials for barbecue grill handles.

There are two main embodiments of a barbecue grill disclosed herein. In both embodiments, a barbecue grill is provided with a handle mounted exterior to a cooking chamber. A heat shield or a heat barrier is also provided that is positioned between a heated volume of the cooking chamber and at least a portion of the handle. In the first main embodiment, the heat barrier comprises an externally mounted heat shield that is positioned directly between the handle and the outside surface of the cooking chamber to significantly reduce radiative and convective heat transfer to the handle. In the second main embodiment, the heat barrier comprises a substantially closed volume which uses air or other material to insulate the handle from the heated volume of the barbecue grill.

Variants of these two main embodiments are contemplated, as more fully described below. Moreover, other embodiments, which can include some combination of the features discussed above and below and other features which are known in the art, are contemplated as falling within the claims even if such embodiments are not specifically identified and discussed herein.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings where:

Figure 1:
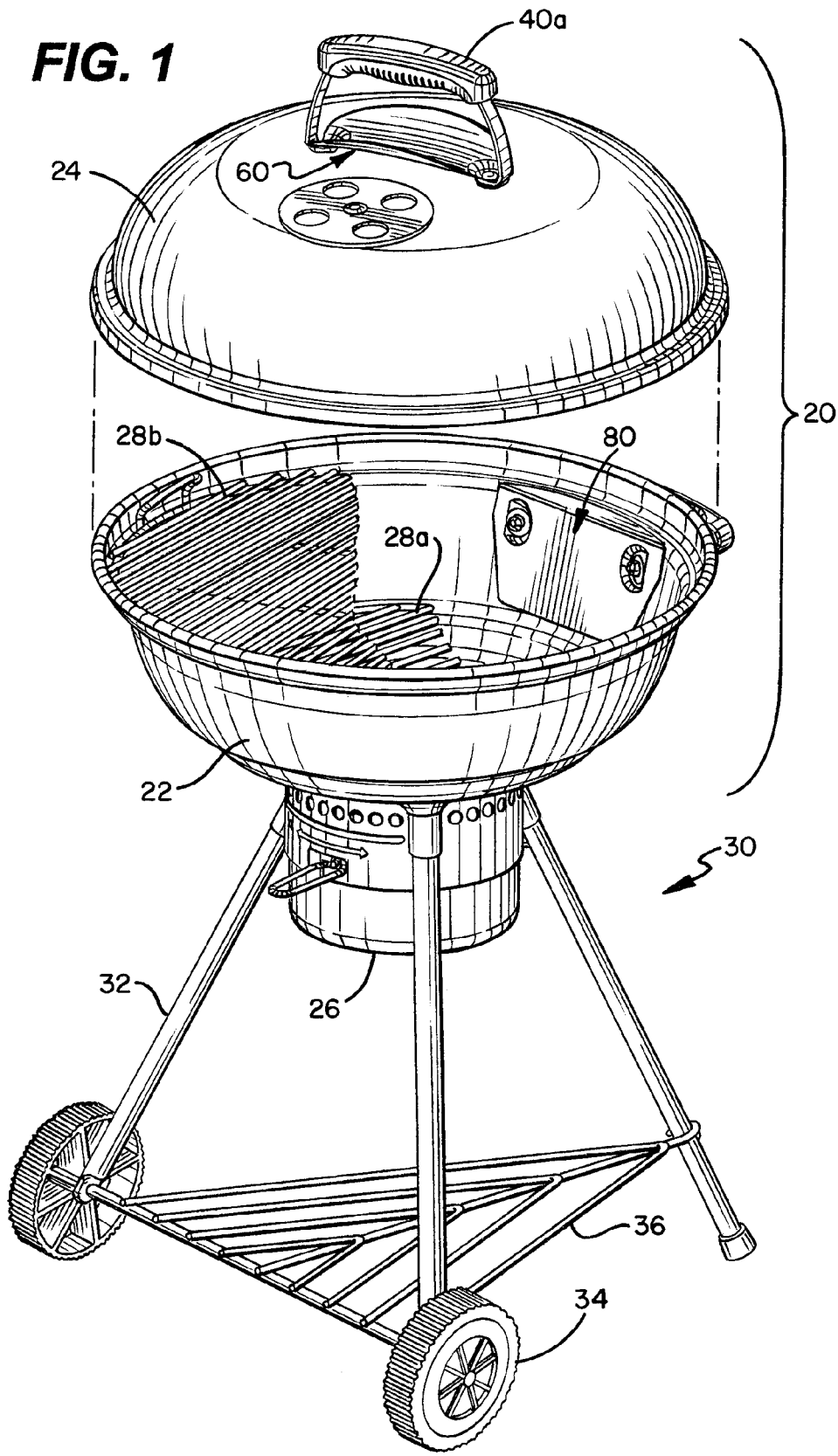
FIG. 1 is a perspective view of a barbecue grill which include two embodiments of a grill handle and heat shield.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from figure to figure in the following detailed description of the drawings.

DETAILED DESCRIPTION OF THE INVENTIONS

Referring first to FIG. 1, a barbecue grill 10 is shown in perspective view. The barbecue grill 10 incorporates numerous components which are common to most conventional grills. For instance, the grill includes a cooking chamber 20 and a cart assembly (or frame structure) 30. The cooking chamber, in turn, includes a firebowl 22, a lid 24, an ash catcher 26, a charcoal grate 28a, and a cooking grate 28b. The lid 24 may be entirely removable, as shown, or could be hingedly attached to the firebowl 22. As shown, the bottom side of firebowl 22 and the top side of the lid 24 are generally closed, which means they are closed for all practical purposes, but may include variously located vents and grease drains. The cart assembly 30, as shown, includes three legs 32, two wheels 34, and a shelf 36. Although in the shown configuration, it is intended that charcoal be used as a heat source, the barbecue grill 10 can be used with various heat sources, such as electric burner elements and gas burners.

The barbecue grill 10, as shown in FIG. 1, includes two handles 40a, 40b one handle 40a positioned at the apex of the lid 24 and the other handle 40b positioned at a side of the firebox 22. As reflected in FIGS. 2-5, both handles 40a, 40b are essentially the same in construction, and include a gripping portion 42a, 42b and a support portion 50a, 50b. The gripping portion 42a, 42b, as shown, has a two piece, molded plastic construction (top member 44a, 44b and bottom member 46a, 46b) that are designed to connect together around support portion 50a, 50b via fastener 48a, 48b. Alternatively, top member 44a, 44b and bottom member 46a, 46b could be configured to snap together. Support portion 50a, 50b includes a connecting section 51a, 51b, which is disposed between the two pieces of the gripping portion 42a, 42b, and two leg portions 52a, 52b, 53a, 53b, which serve to support the gripping member 42a, 42b a spaced distance from the cooking chamber 20. The ends of the leg portions 52a, 52b, 53a, 53b, opposite the gripping portion 42a, 42b, include two inwardly turned flanges 55a, 55b, 56a, 56b, which are provided with apertures that align with corresponding apertures on the cooking chamber 20. The handles 40a, 40b are fixed to the cooking chamber via fasteners 57a, 57b, 58a, 58b which extend through the apertures. As shown, the fasteners 57a, 57b, 58a, 58b comprise nut and bolt combinations. The handle 40a, 40b configuration shown and described is for example only, and unless otherwise indicated in the claims, are not intended to limit the scope of the claims.

The barbecue grill 10, as shown in FIG. 1, also includes two versions of a heat shield 60, 80. The first embodiment of the heat shield 60 is configured for installation at an exterior of the cooking chamber, while the second embodiment of the heat shield 80 is configured for installation at an interior of the cooking chamber.

Figure 2:
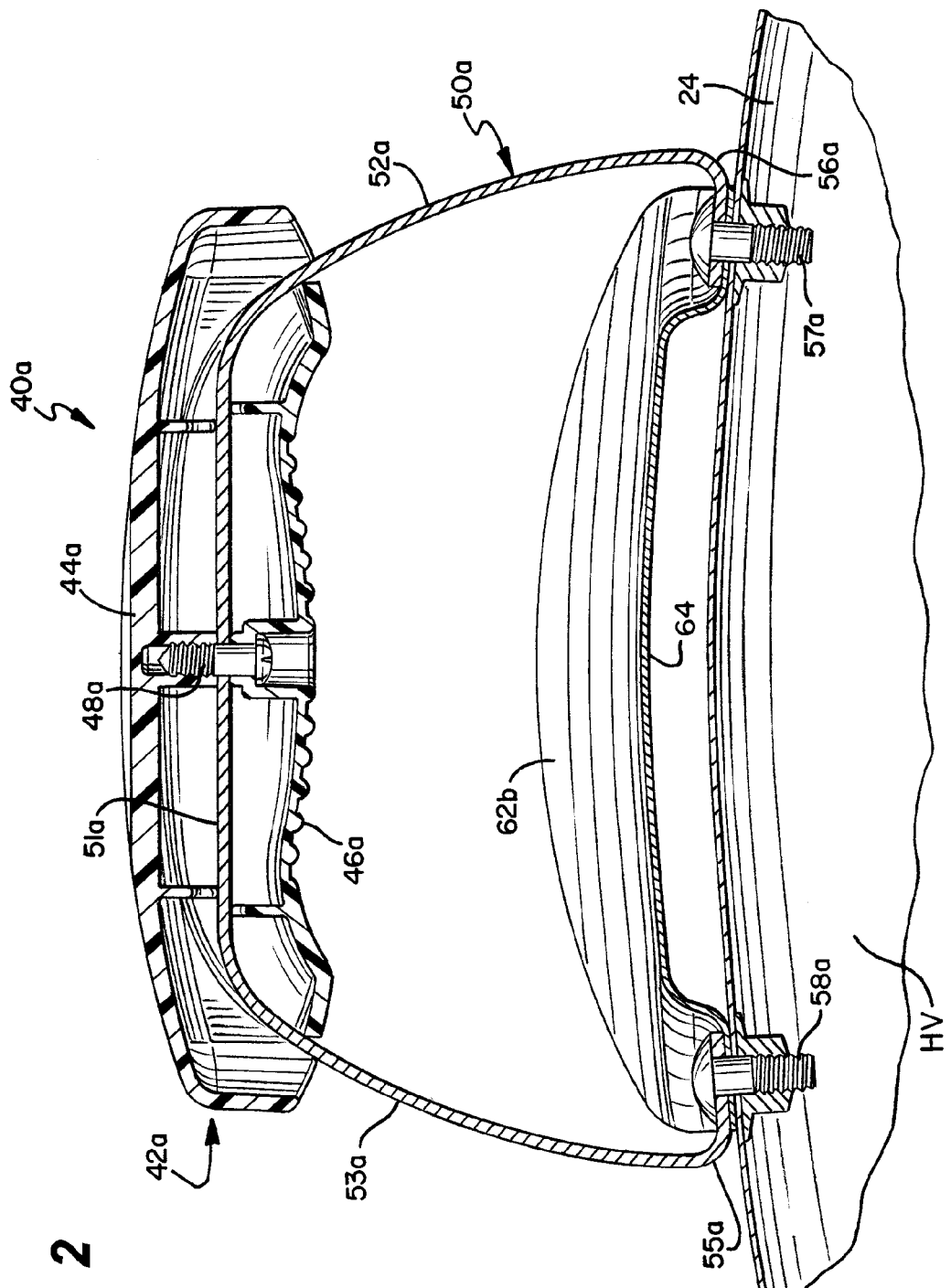
FIG. 2 is a first sectional view of the first embodiment of the grill handle and heat shield.
Figure 3:
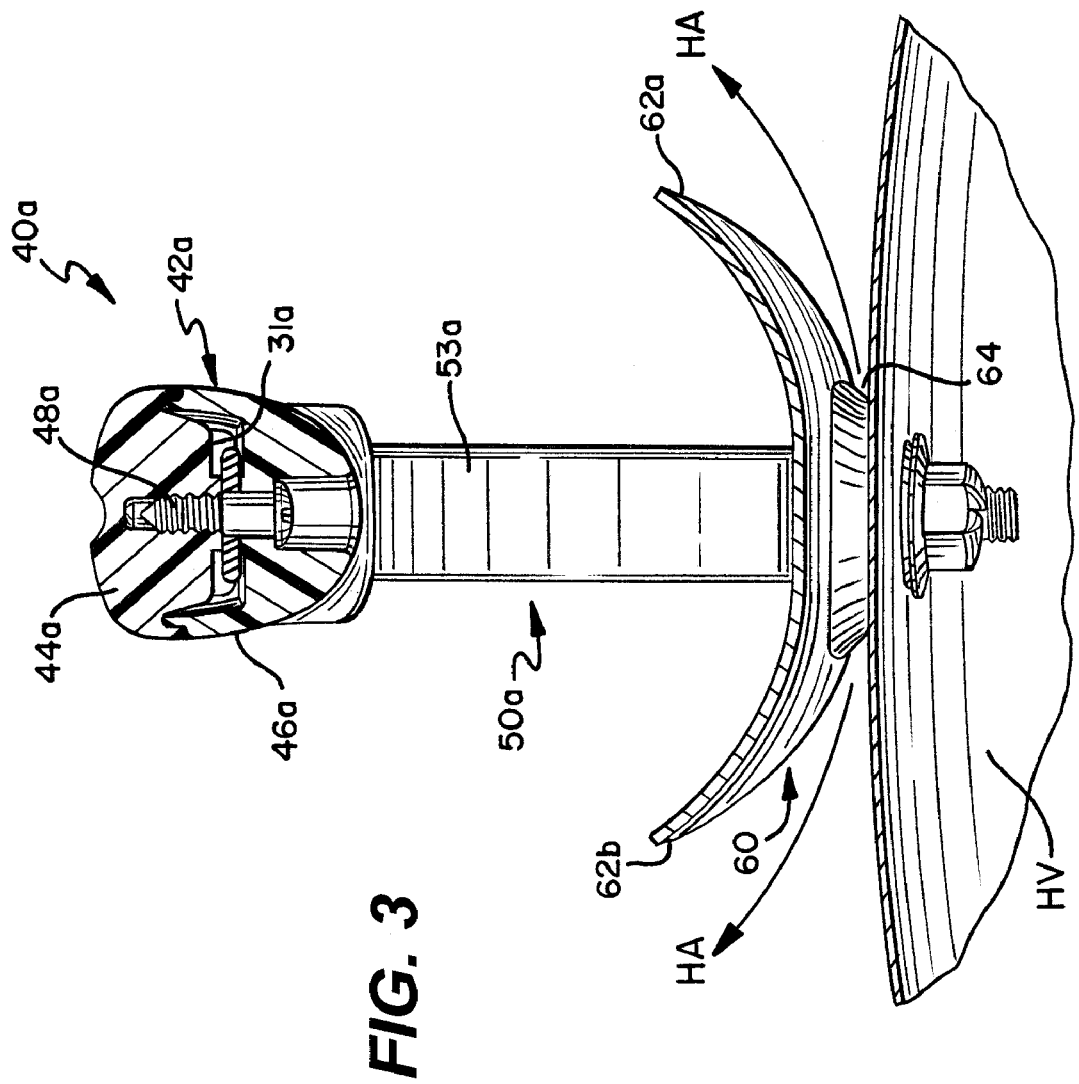
FIG. 3 is a second sectional view of the same.

Turning now to FIGS. 2-3, two cross sectional views are provided which show the first embodiment of the heat shield 60 in more detail. As shown, the heat shield 60 is affixed adjacent the outside surface of the lid 24 and is disposed between the outside surface of the lid 24 and the gripping portion 42a of the handle. The heat shield 60 includes apertures which align with the apertures on the handle 40a and the lid 24, whereby the same fasteners 56a, 58a can be used to affix the heat shield 60 to the lid 24. The heat shield 60 has a longitudinal axis which is generally aligned with a length of the gripping portion. When viewed in a cross section plane normal to the longitudinal axis, the heat shield 60 has a generally parabolic shape with two upturned ends 62a, 62b and a vertex 64 that has a spaced positional relationship to the outside surface of the lid 24. Note, however, that the heat shield 60 could be spherical shaped or egg shaped, wherein it would have a single upturned edge that surrounds handle. The two upturned ends 62a, 62b are laterally spaced on opposite sides of the handle 40a, whereby the heat shield 60 is configured to form a heat barrier between a heated volume HV of the cooking chamber 20 and the gripping portion 42a of the handle. More specifically, the shape of the heat shield 60 directs heated air HA away from the handle and thereby reduces convective heat transfer from the cooking chamber 20 to the handle 40a. Preferably, the heat shield 60 is formed from sheet metal comprising stainless steel, whereby the heat shield 60 has a reflective surface to reduce radiation heat transfer.

Figure 4:
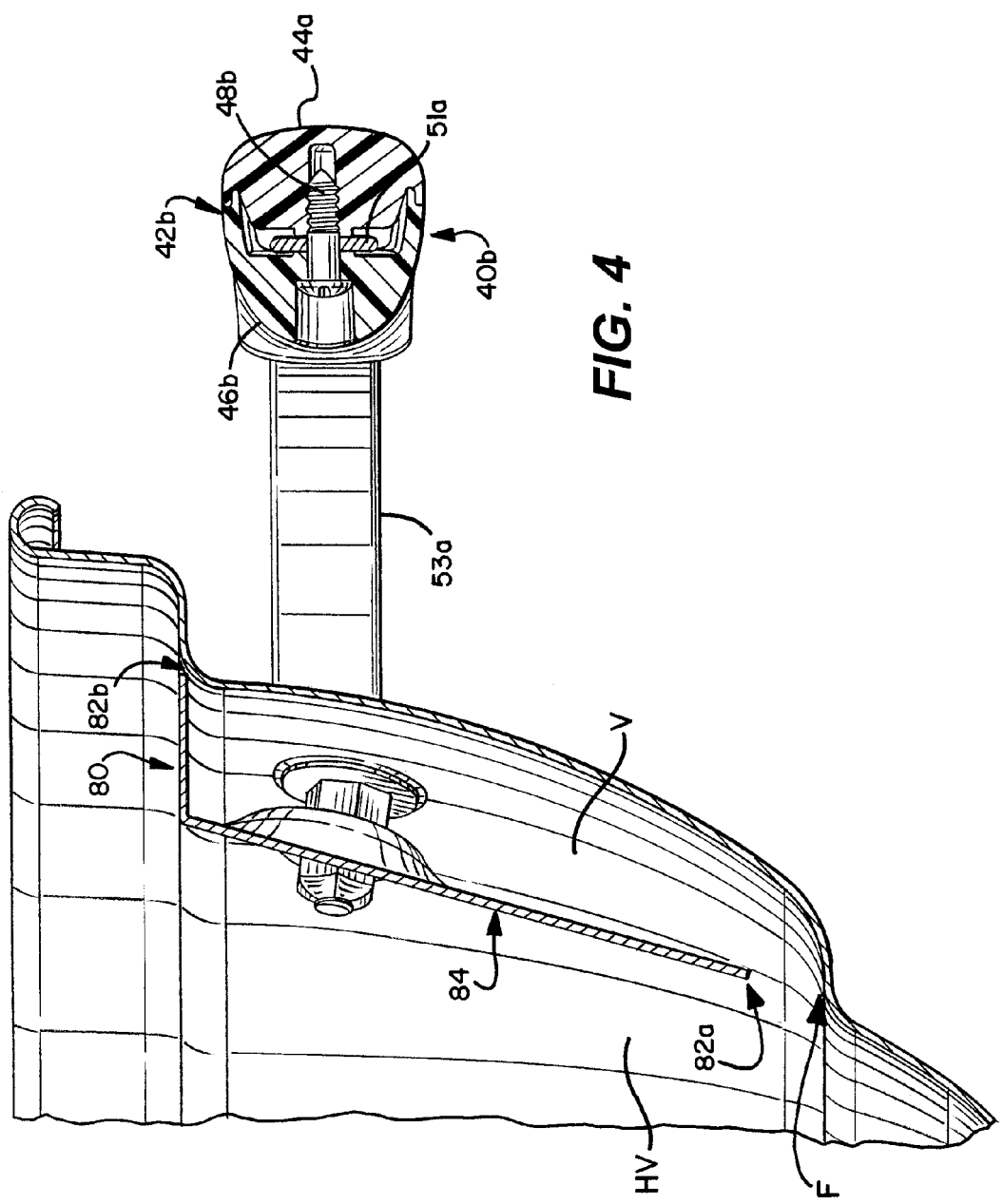
FIG. 4 is a first section view of the second embodiment of the grill handle and heat shield; and, FIG. 5 is an exploded view of the same.
Figure 5:
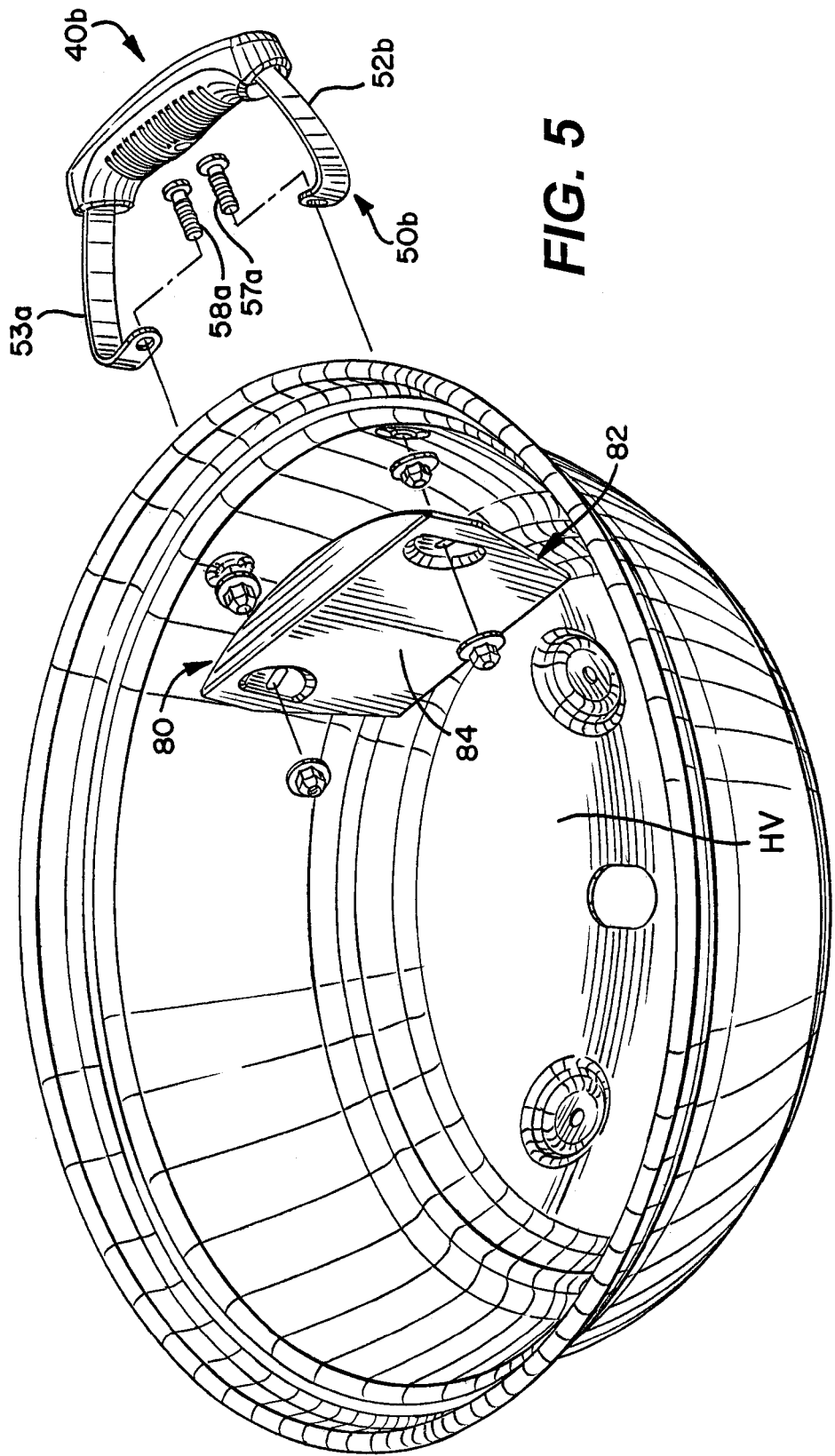

Turning now to FIGS. 4-5, a cross sectional view and an exploded view are provided which show the second embodiment of the heat shield 80 in more detail. As shown, the heat shield 80 is affixed adjacent the inside surface of the firebowl 22, opposite the handle 40b. The heat shield 80 includes apertures which align with the apertures on the handle 40b and the firebowl 22, whereby the same fasteners 56b, 58b can be used to affix the heat shield 80 to the firebowl 22. Note, however, that additional nuts are provided which are placed between the shield 80 and the firebowl 22, and which act to space the heat shield 80 a distance from the inside surface of the firebowl 22. The heat shield 80 includes a perimetric edge region 52 and a central region 84. The perimetric edge region 82 of the heat shield 80 is in at least close proximity to the inside surface of the firebowl 22 and surrounds the central region of the heat shield. At least of a portion of the central region 84 of the heat shield has a spaced positional relationship to the inside surface of the firebowl 22, In this manner, the heat shield 80 defines an at least partially closed volume V, which is disposed between the heated volume HV of the cooking chamber and the handle 40b. The at least partially closed volume V forms an insulating barrier to insulate the handle 40b from the heated volume HV of the cooking chamber. In the shown embodiment, air is used as the insulting material, although it is contemplated that other types of insulating material could be used, so long as they are appropriate for high temperature applications.

Note, however, that the bottom edge 82a of the heat shield 80 is spaced further from the inside surface of the firebowl 22 than is the upper edge 82b of the heat shield 80. In the shown configuration, this is preferable because the heat source (i.e., charcoal) is at about the same elevation as the heat shield. Therefore, fresh, cool air F is able to enter the at least partially closed volume to better insulate the handle. Like the first embodiment, the second embodiment of the heat shield 80 is formed from sheet metal comprising stainless steel, whereby the heat shield 80 has a reflective surface to reduce radiation heat transfer.

Although the first embodiment of the heat shield 60 is shown attached to the lid 24, and the second embodiment of the heat shield 80 is shown attached to the firebowl, it is contemplated that either embodiment of invention could be used on either or both of the firebowl and lid. Moreover, it is contemplated that both embodiments of the heat shield 60, 80 could be employed for use with a single handle 40a, 40b.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A barbecue grill comprising:
a cooking chamber at least partially defined by a firebowl and a lid, the lid having an outside surface, a bottom side opening, and a generally closed top side, the lid having the general shape of a hollow spherical segment;
a handle and a heat shield positioned approximately at an apex of the lid;
the handle comprising a gripping portion and at least two leg portions, each of the two leg portions at a first end having a flange affixed adjacent to the outside surface of the lid, and the gripping portion extending between the two leg portions at a second end, whereby the gripping portion has a spaced positional relationship to the outside surface of the lid;
the heat shield affixed adjacent the outside surface of the lid and disposed between the outside surface of the lid and the gripping portion of the handle, the heat shield having a longitudinal axis which is generally aligned with a length of the gripping portion, the heat shield in a cross section plane having a generally parabolic shape with two upturned ends and a vertex that has a spaced positional relationship to the outside surface of the lid, the cross section plane being generally normal to the longitudinal axis of the heat shield, the two upturned ends being laterally spaced on opposite sides of the handle, whereby the heat shield is configured to form a heat barrier between a heated volume of the cooking chamber and the gripping portion of the handle;
the heat shield being formed from sheet metal comprising stainless steel, whereby the heat shield has a reflective surface to reduce radiation heat transfer; and,
the flange, the lid, and the heat shield each having at least one aperture which are correspondingly aligned and through which at least one fastener extends to affix the handle and the heat shield to the firebowl.

2. A barbecue grill comprising:
a cooking chamber at least partially defined by a firebowl having an inside surface, an outside surface, a top side opening and a generally closed bottom side, the firebowl having the general shape of a hollow spherical segment;
a handle comprising a gripping portion and at least two leg portions, each of the two leg portions at a first end having a flange affixed adjacent to the outside surface of the firebowl, and the gripping portion extending between the two leg portions at a second end, whereby the gripping portion has a spaced positional relationship to the outside surface of the firebowl;
a heat shield affixed adjacent the inside surface of the firebowl and opposite the handle, the heat shield comprising a perimetric edge region and a central region, the perimetric edge region being in at least close proximity to the inside surface of the firebowl and surrounding the central region of the heat shield, at least of a portion of the central region of the heat shield having a spaced positional relationship to the inside surface of the firebowl, whereby the heat shield and inside surface of the firebowl collectively define an at least partially closed volume disposed opposite the handle to form an insulating barrier to insulate the handle from a heated volume of the cooking chamber;
the heat shield being formed from sheet metal comprising stainless steel, whereby the heat shield has a reflective surface to reduce radiation heat transfer; and,
the flange, the firebowl, and the heat shield each having at least one aperture which are correspondingly aligned and through which at least one fastener extends to affix the handle and the heat shield to the firebowl, the fastener including a spacer disposed between the heat shield and the inside surface of the firebowl to prevent distortion of the heat shield caused by overtightening of the fastener.

* * * * *